V. J. MAUNTEL.
UTENSIL.
APPLICATION FILED NOV. 12, 1914.
1,168,092.
Patented Jan. 11, 1916.
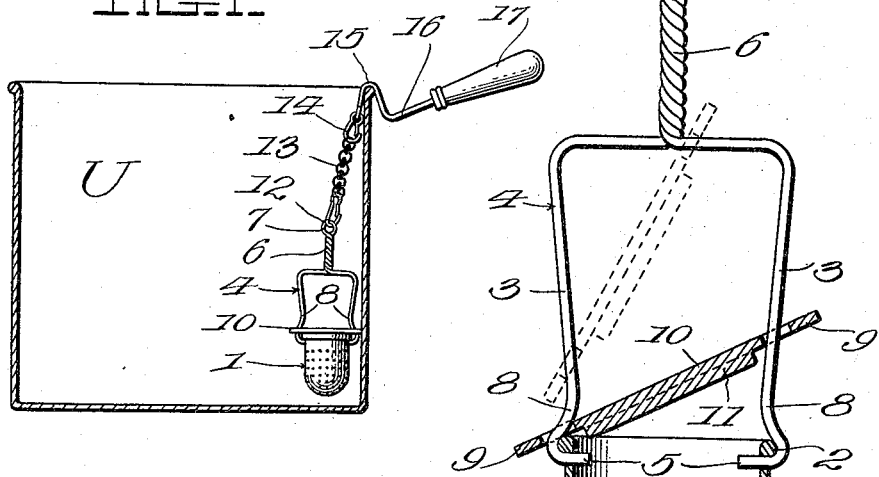
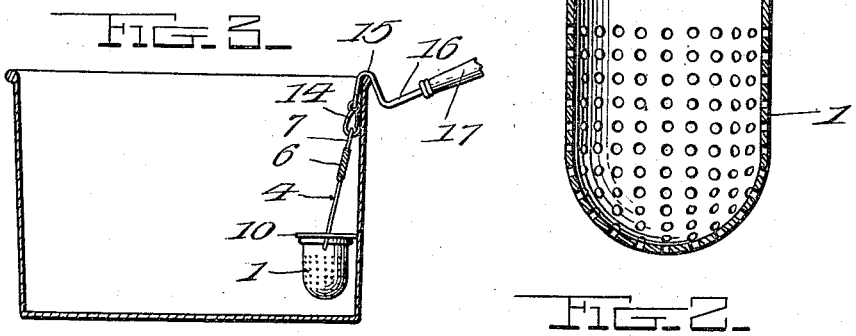
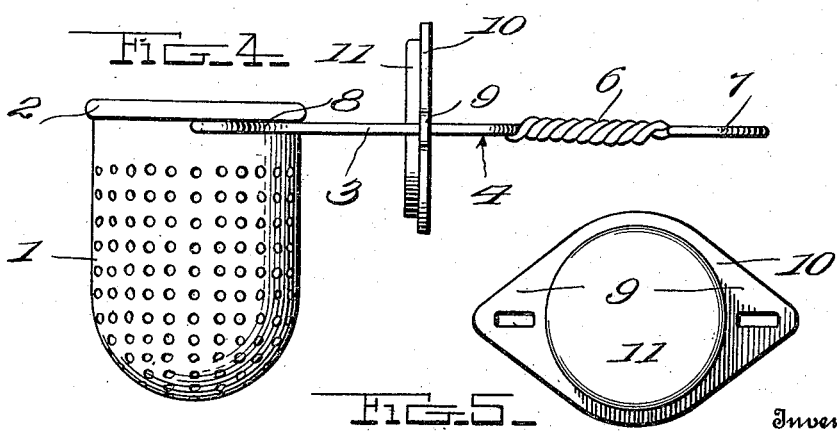

UNITED STATES PATENT OFFICE.

VINCENT J. MAUNTEL, OF WASHINGTON, MISSOURI.

UTENSIL.

1,168,092. Specification of Letters Patent. Patented Jan. 11, 1916.

Application filed November 12, 1914. Serial No. 871,731.

*To all whom it may concern:*

Be it known that I, VINCENT J. MAUNTEL, a citizen of the United States, residing at Washington, in the county of Franklin and State of Missouri, have invented certain new and useful Improvements in Utensils; and I do declare the following to be a full, clear, and exact description of the invention, such as will enable others skilled in the art to which it appertains to make and use the same.

My invention relates to improvements in utensils and has for its main object to provide a simple and inexpensive household article which will be well adapted to a number of uses, and which will be comparatively sanitary.

In carrying out the above, a perforated container is provided, said container being equipped with a U-shaped bail whose arms are pivoted thereto, a cover being also provided for the container.

A still further object of the invention therefore becomes to construct the bail in such a manner as to cause the same to act as means for locking the cover upon the container.

Yet another object is to provide a rib or bead on the container for coaction with the arms of the bail when the latter is swung to a horizontal position, whereby relative movement of the container and the bail will be prevented.

Yet another object is to provide simple and efficient means whereby the container may be supported in cooking utensils of different depths.

With the above and other objects in view, the invention resides in certain novel features of construction and combination herein described and claimed and shown in the drawings wherein:—

Figure 1 is a vertical section of a cooking utensil, showing the application of my invention thereto; Fig. 2 is an enlarged vertical section of the container, showing the cover thereof partially raised in full lines and raised to its limit in dotted lines; Fig. 3 is a view similar to Fig. 1 but illustrating the device suspended in a utensil of less depth; and Fig. 4 is a side elevation showing the bail swung to a horizontal position; Fig. 5 is a bottom plan view of the cover.

In the accompanying drawings, forming part of the present application, the numeral 1 designates a perforated cup-shaped container which may be formed of tin, aluminum, silver or other appropriate material. The upper edge of the container 1 is surrounded by a bead 2, directly beneath which the arms 3 of an inverted U-shaped bail 4 are pivoted, the free ends of said arms being preferably bent inwardly as seen at 5 and extended through openings in the opposite sides of the container 1. This bail 4 may be provided with an upright twisted wire shank 6 having an eye 7 at its outer end, if desired, although these parts could be dispensed with. It becomes expedient, however, to equip the device with the members 6 and 7, since they constitute a handle when the device is used in the manner to be set forth.

The free end portions of the arms 3 are curved inwardly toward each other as seen at 8 to provide resilient stops upon which and upon the remaining portions of the arms 3, a pair of bearings 9 formed on the opposite side edges of a cover plate 10 are slidably mounted, this plate 10 preferably having a cylindrical enlargement 11 on its lower side which fits snugly within the upper end of the container 1. By this construction, the cover is normally held in closed position, but will be equally as efficiently held in the full line position seen in Fig. 2 or in the dotted line position seen in this figure, the bearings 9 preferably having elongated slots for allowing such movement of the cover.

Adapted for removable attachment to the eye 7, is a snap 12 on one end of a chain 13 and a second snap 14 which is loosely secured to the bill of a hook 15, the shank 16 of the latter having an appropriate operating handle 17. When the container 1 is to be suspended within a comparatively deep cooking utensil U as seen in Fig. 1, the snap 12 is connected to the eye 7 and the snap 14 is connected to the other end of the chain 13, the hook 15 being now engaged with the upper edge of the utensil as shown. When, however, the device is employed in a comparatively shallow utensil (see Fig. 3), the chain 13 is not needed, and the snap 14 is snapped directly into the eye 7, the hook 15 now engaging the upper edge of the utensil.

When the container 1 is suspended within a utensil, it may be employed for containing numerous kinds of condiments or seasonings. It is particularly adapted for use as a coffee or tea percolator.

The container may further be used as a strainer, as seen in Fig. 4, during which use the bail 4 is swung laterally to a horizontal position, the cover plate 10 having been previously raised upon the arm 3. In moving the bail to this horizontal position, the resilient stops 8 spring over the bead 2 and contact with the under side thereof, thereby retaining the bail 4 in fixed relation in respect to the container.

The device constructed as above described and as shown in the drawings, possesses a number of advantageous features, and may be easily and cheaply marketed.

I claim:

1. A utensil comprising a container open at its top, an external bead surrounding said top, an inverted U-shaped bail having its arms pivoted to opposite sides of the container directly below said bead, the free end portions of said arms being curved inwardly toward each other to provide resilient stops to spring over said bead and contact with the underside thereof, when the bail is swung to a horizontal position, a cover for said container, and bearings on the cover slidable on said arms of the bail, whereby the resilient stops thereon may retain said cover in closed position when the bail is swung to an upright position.

2. A utensil comprising a container open at its top and having a pair of bearing openings adjacent its upper edge, an inverted U-shaped bail having the ends of its arms bent inwardly to form trunnions adapted to be slidably held in said bearing openings, the portions of said arms adjacent their ends being curved inwardly toward each other to provide resilient stops, a cover for said container, said cover having openings therethrough to receive the arms of the bail, the distance between the inner edges of said openings being greater than the distance between said resilient stops, whereby the cover may be held in a plurality of elevated positions above the container, said arms being adapted to spring apart to permit the cover to be adjusted.

In testimony whereof I have hereunto set my hand in presence of two subscribing witnesses.

VINCENT J. MAUNTEL.

Witnesses:
W. H. KAUMANN,
V. J. BLECKMANN.